US008690182B2

(12) United States Patent
Wrightman

(10) Patent No.: US 8,690,182 B2
(45) Date of Patent: Apr. 8, 2014

(54) STRUT FOR SNOWMOBILE

(76) Inventor: Robert A. Wrightman, Bracebridge (CA)

( * ) Notice: Subject to any disclaimer, the term of this patent is extended or adjusted under 35 U.S.C. 154(b) by 0 days.

(21) Appl. No.: 13/221,293

(22) Filed: Aug. 30, 2011

(65) Prior Publication Data

US 2012/0104709 A1 May 3, 2012

Related U.S. Application Data

(63) Continuation-in-part of application No. 12/046,991, filed on Mar. 12, 2008, and a continuation-in-part of application No. 12/906,776, filed on Oct. 18, 2010.

(60) Provisional application No. 60/894,252, filed on Mar. 12, 2007, provisional application No. 61/252,411, filed on Oct. 16, 2009.

(30) Foreign Application Priority Data

Oct. 22, 2007 (CA) ..................... 2604041

(51) Int. Cl.
*A63C 5/06* (2006.01)

(52) U.S. Cl.
USPC .......... 280/606; 280/609; 280/28; 280/11.18; 180/182

(58) Field of Classification Search
USPC ........ 280/606, 601, 609, 14.1, 818, 845, 900, 280/14, 11.18, 11.12; 180/180, 182, 186, 180/190
See application file for complete search history.

(56) References Cited

U.S. PATENT DOCUMENTS

| 573,034 | A | * | 12/1896 | Peterson ................... 280/7.12 |
| 1,521,818 | A | | 1/1925 | Katona |
| 1,768,046 | A | * | 6/1930 | Fredrickson et al. ........ 280/14.1 |
| 3,482,849 | A | | 12/1969 | Puetz |
| 3,605,926 | A | | 9/1971 | Leonawicz |
| 3,643,978 | A | | 2/1972 | Westberg |
| 3,718,341 | A | | 2/1973 | Westberg |
| 3,785,665 | A | | 1/1974 | Merenheimo et al. |
| 3,817,544 | A | | 6/1974 | Labelle |
| 3,844,367 | A | | 10/1974 | Flohr |
| 3,857,578 | A | | 12/1974 | Alton |
| 3,866,933 | A | | 2/1975 | Mollring |
| 3,877,713 | A | | 4/1975 | Mabie et al. |
| 3,897,839 | A | | 8/1975 | Brisebois |
| 3,942,812 | A | | 3/1976 | Kozlow |
| 3,977,485 | A | | 8/1976 | West et al. |
| 4,077,639 | A | | 3/1978 | Reedy |
| 4,340,241 | A | * | 7/1982 | Crocket ....................... 280/609 |
| 4,491,333 | A | | 1/1985 | Warnke |
| 5,038,882 | A | | 8/1991 | Zulawski |

(Continued)

FOREIGN PATENT DOCUMENTS

| CA | 2605619 A1 | 4/2008 |
| CA | 2604041 C | 3/2009 |

*Primary Examiner* — J. Allen Shriver, II
*Assistant Examiner* — Steve Clemmons
(74) *Attorney, Agent, or Firm* — John R. S. Orange; Blake, Cassels & Graydon LLP

(57) ABSTRACT

A snowmobile ski comprises a body having a pair of rails laterally spaced from one another and interconnected at a tip. A spindle assembly connects the ski to suspension elements of the snowmobile. The spindle assembly has a pair of legs connected to respective rails to allow snow to pass between the legs.

14 Claims, 23 Drawing Sheets

(56) References Cited

U.S. PATENT DOCUMENTS

| | | | |
|---|---|---|---|
| 5,109,941 A | 5/1992 | Thompson | |
| 5,209,505 A | 5/1993 | Bastille et al. | |
| 5,344,168 A | 9/1994 | Olson et al. | |
| 5,443,278 A | 8/1995 | Berto | |
| 5,836,594 A | 11/1998 | Simmons | |
| 6,105,979 A | 8/2000 | Desrochers | |
| 6,276,699 B1 | 8/2001 | Simmons et al. | |
| 6,378,889 B1 | 4/2002 | Moriyama | |
| 6,431,561 B1 | 8/2002 | Hedlund | |
| 6,520,512 B1 | 2/2003 | Lachance | |
| D473,488 S | 4/2003 | Mallette et al. | |
| D478,841 S | 8/2003 | Bruns | |
| D480,332 S | 10/2003 | Cormican | |
| 6,692,009 B2 | 2/2004 | Lemieux | |
| 6,705,620 B2 | 3/2004 | Bruns | |
| 6,772,061 B1 | 8/2004 | Berthiaume et al. | |
| 6,860,352 B2 * | 3/2005 | Mallette et al. | 180/182 |
| RE39,012 E | 3/2006 | Noble et al. | |
| 7,017,695 B2 | 3/2006 | Meunier et al. | |
| 7,195,254 B2 * | 3/2007 | Makitalo | 280/28 |
| 7,287,763 B1 | 10/2007 | Beaudoin | |
| 7,481,437 B2 | 1/2009 | Musselman | |
| 7,487,975 B2 | 2/2009 | Pryputniewicz | |
| 2001/0022435 A1 | 9/2001 | Cormican | |
| 2001/0032744 A1 | 10/2001 | Moriyama | |
| 2002/0036387 A1 | 3/2002 | Lemieux | |
| 2002/0074752 A1 | 6/2002 | Noble | |
| 2002/0149174 A1 | 10/2002 | Cormican | |
| 2003/0019676 A1 | 1/2003 | Mallette et al. | |
| 2003/0160405 A1 | 8/2003 | Bruns | |
| 2003/0189302 A1 | 10/2003 | Makitalo | |
| 2003/0234500 A1 | 12/2003 | Roberts et al. | |
| 2004/0099458 A1 | 5/2004 | Meunier et al. | |
| 2005/0103547 A1 * | 5/2005 | Mallette et al. | 180/190 |
| 2005/0252705 A1 | 11/2005 | Abe et al. | |
| 2006/0032686 A1 * | 2/2006 | Berg | 180/190 |
| 2006/0033294 A1 | 2/2006 | Roberts et al. | |
| 2006/0061051 A1 | 3/2006 | Lemieux | |
| 2006/0061052 A1 | 3/2006 | Lemieux | |
| 2006/0076742 A1 | 4/2006 | Wayne | |
| 2006/0163826 A1 | 7/2006 | Huntimer et al. | |
| 2006/0175777 A1 | 8/2006 | Lemieux et al. | |
| 2007/0069487 A1 | 3/2007 | Lemieux et al. | |
| 2007/0090614 A1 | 4/2007 | Pryputniewicz | |
| 2007/0182111 A1 | 8/2007 | Lachance | |
| 2007/0257453 A1 | 11/2007 | Lemieux et al. | |
| 2007/0267847 A1 * | 11/2007 | Carlson et al. | 280/609 |
| 2011/0079970 A1 | 4/2011 | Pryputniewicz | |

* cited by examiner

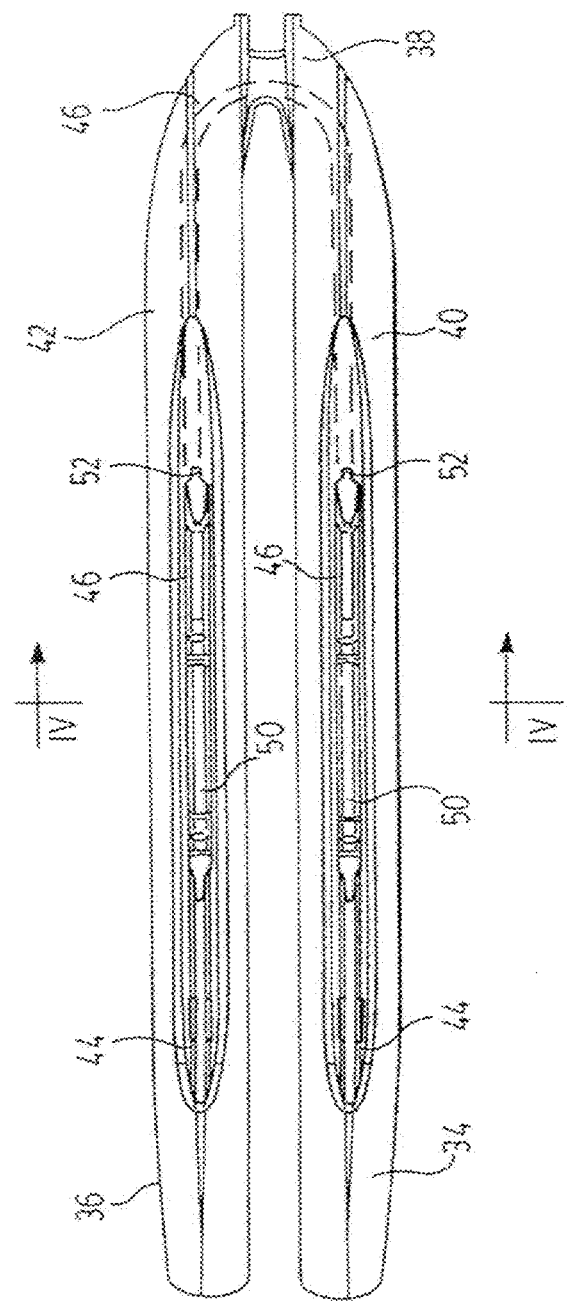

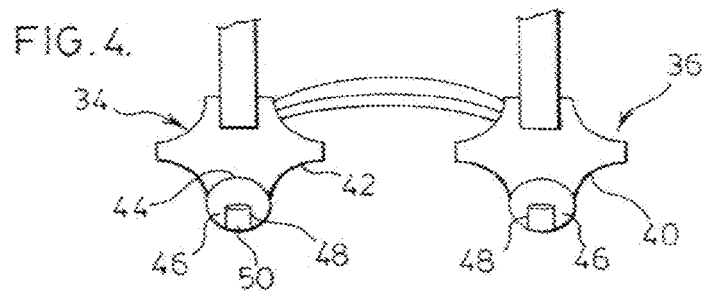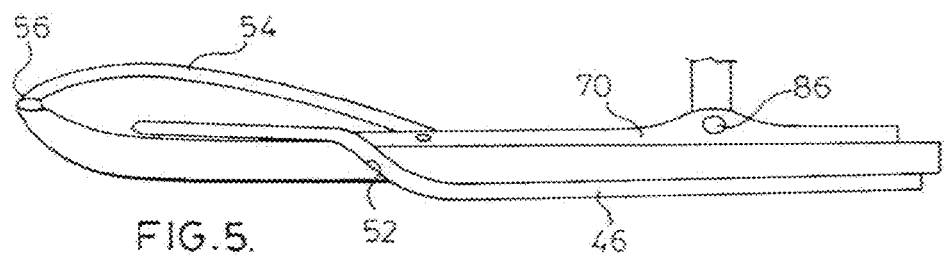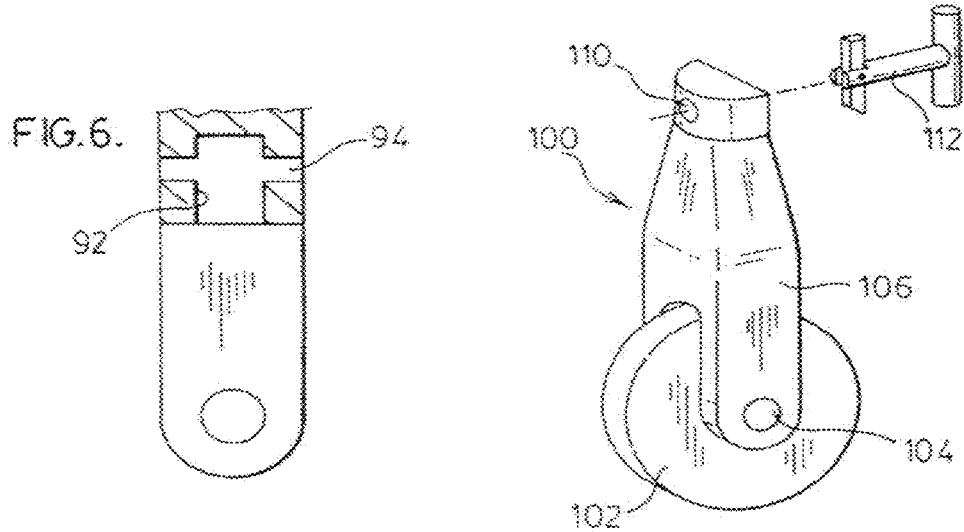

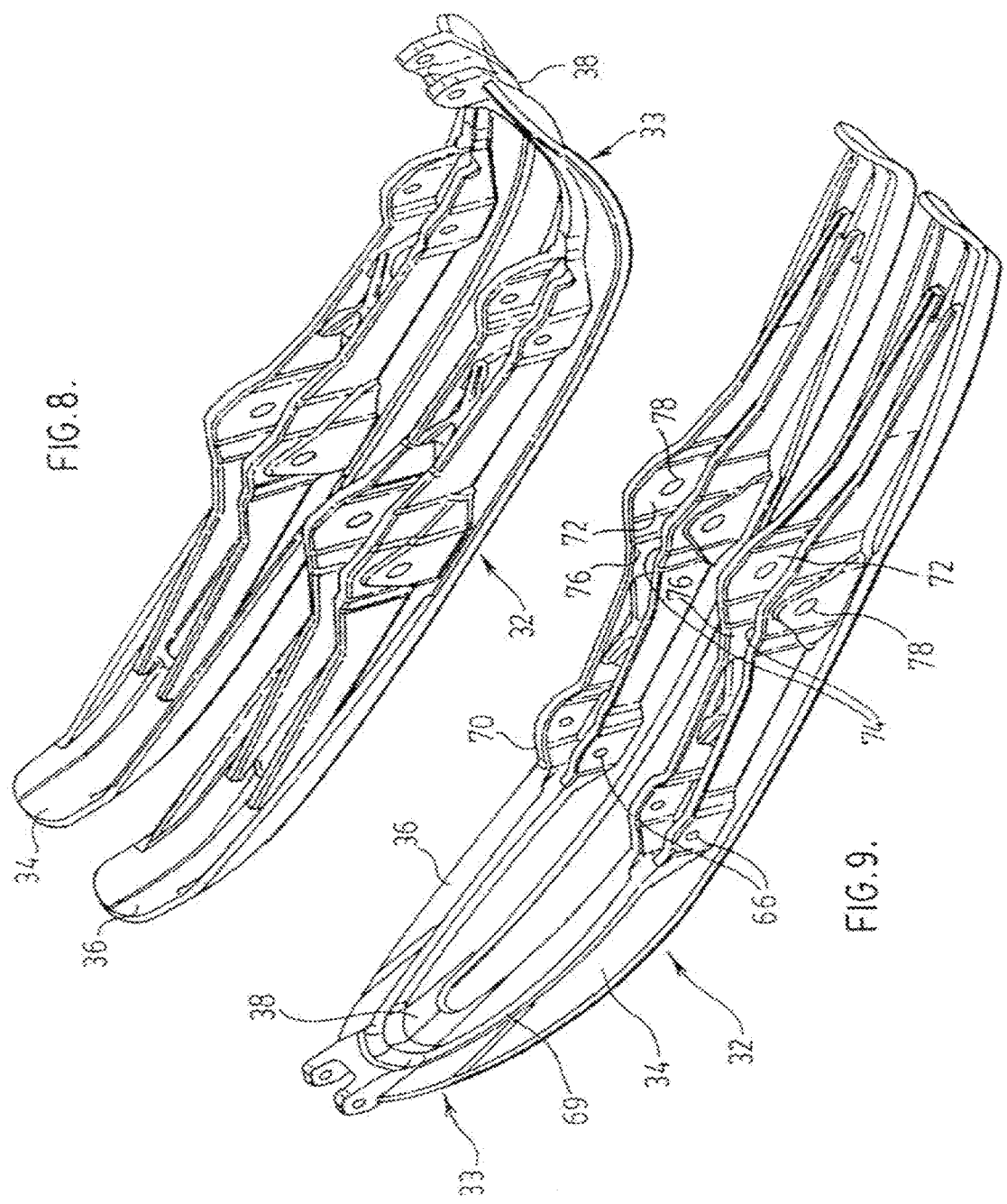

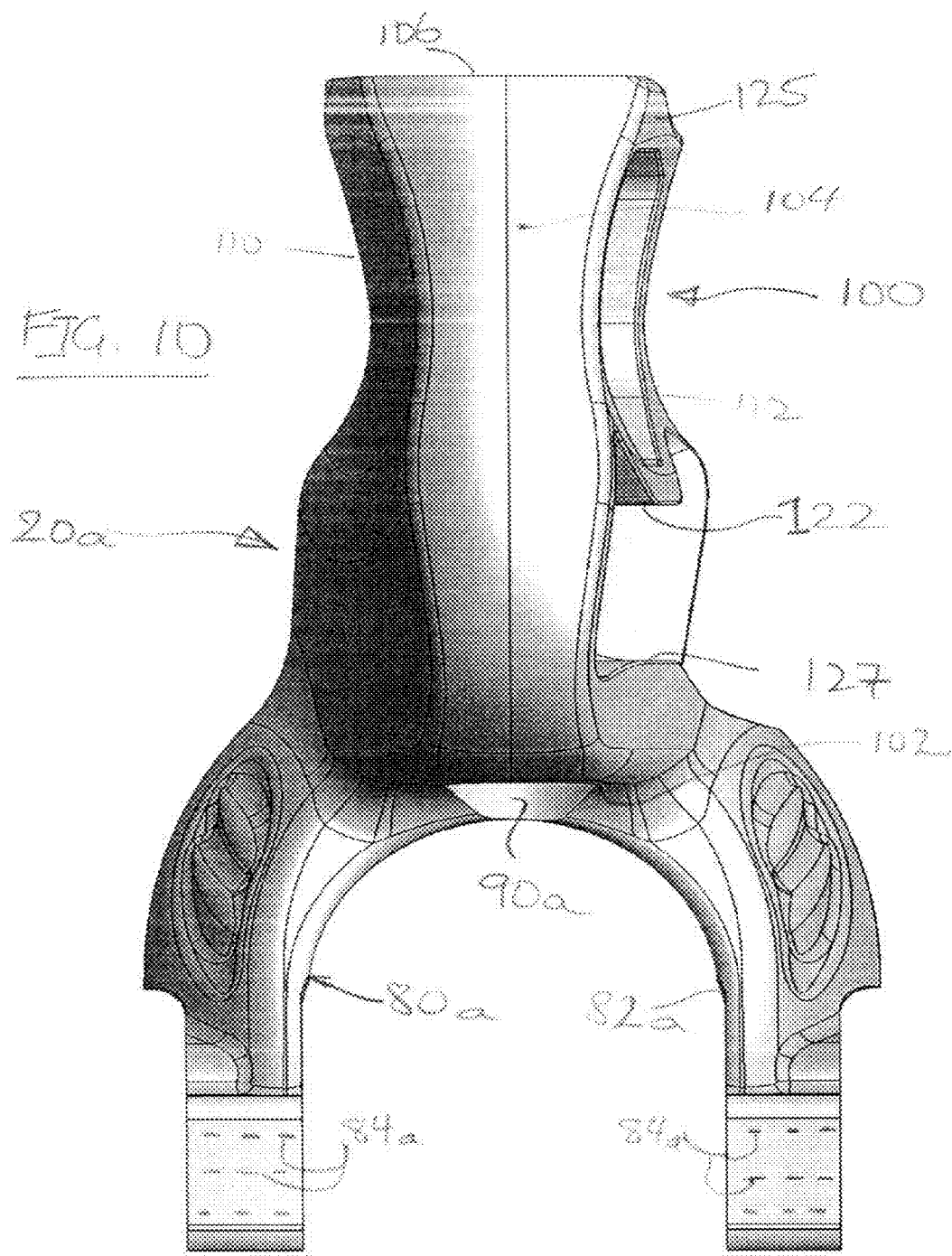

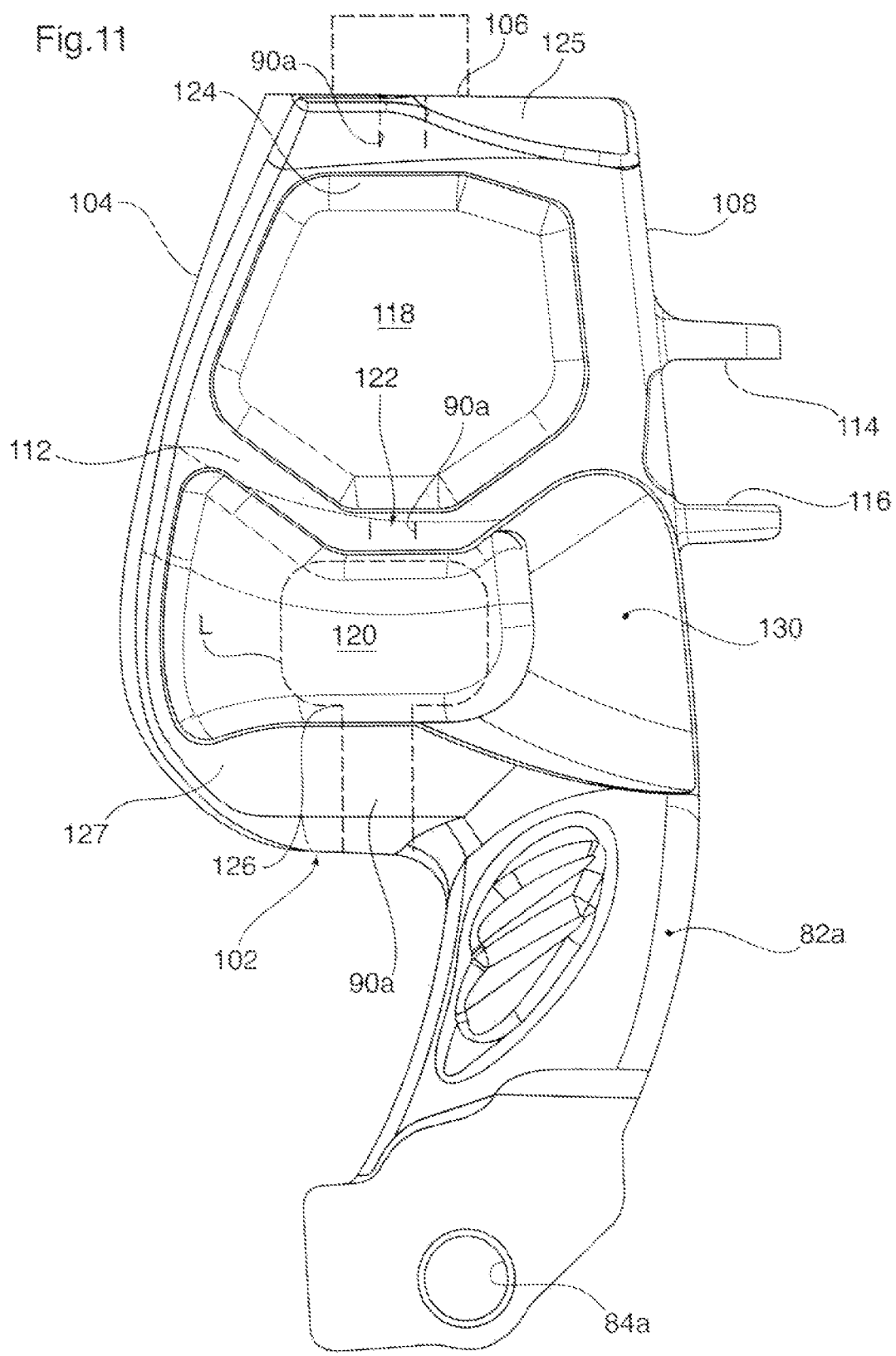

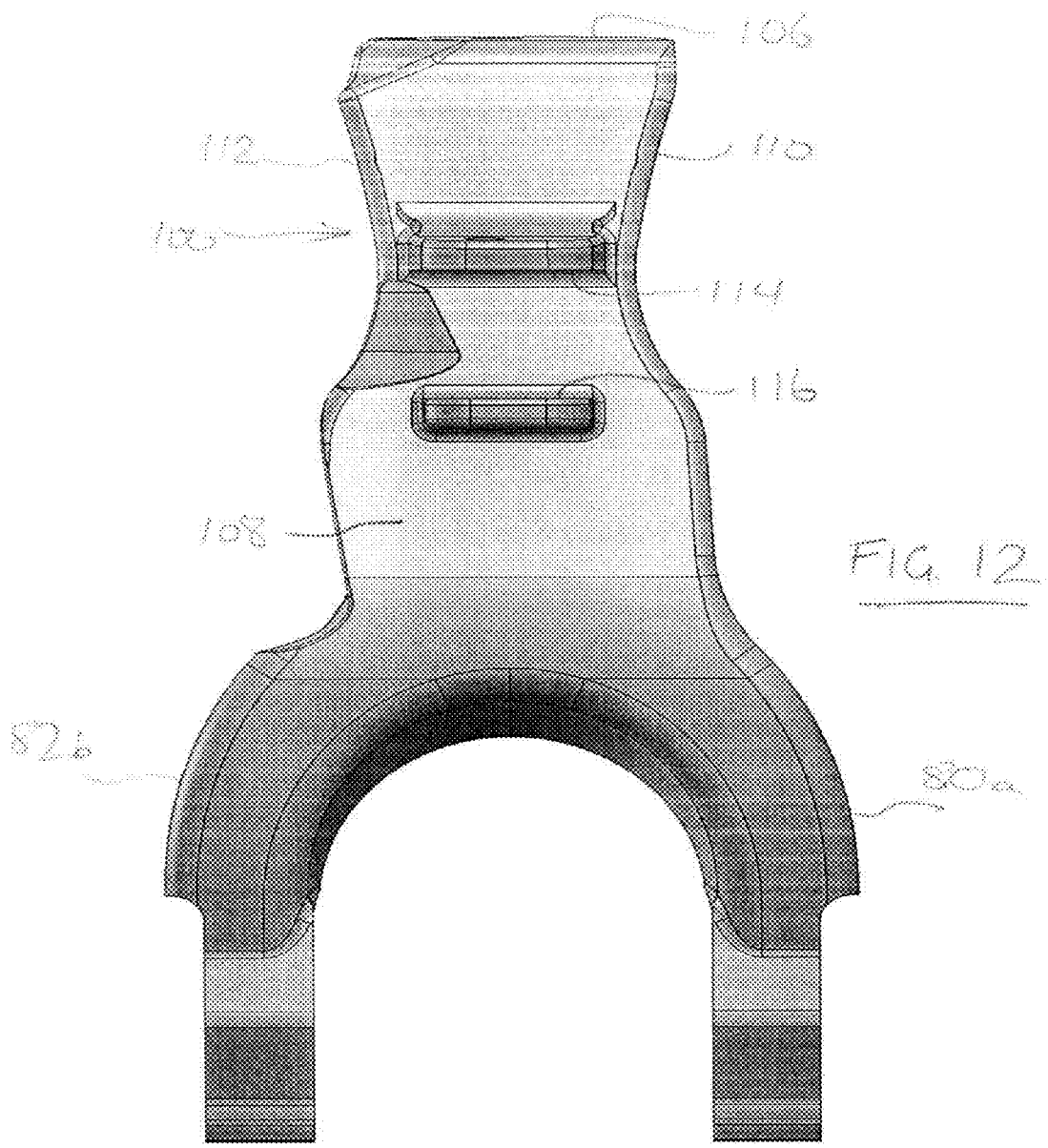

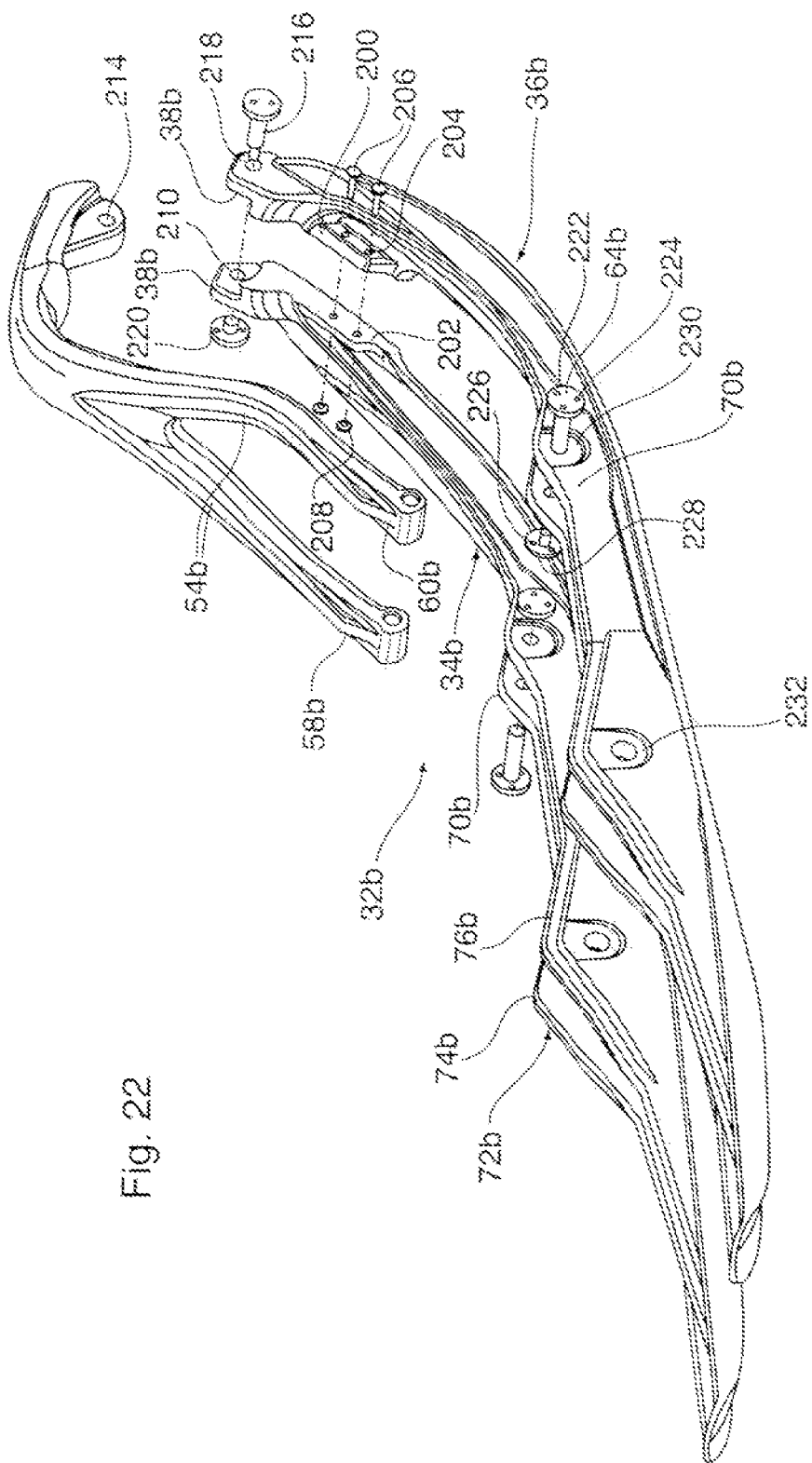

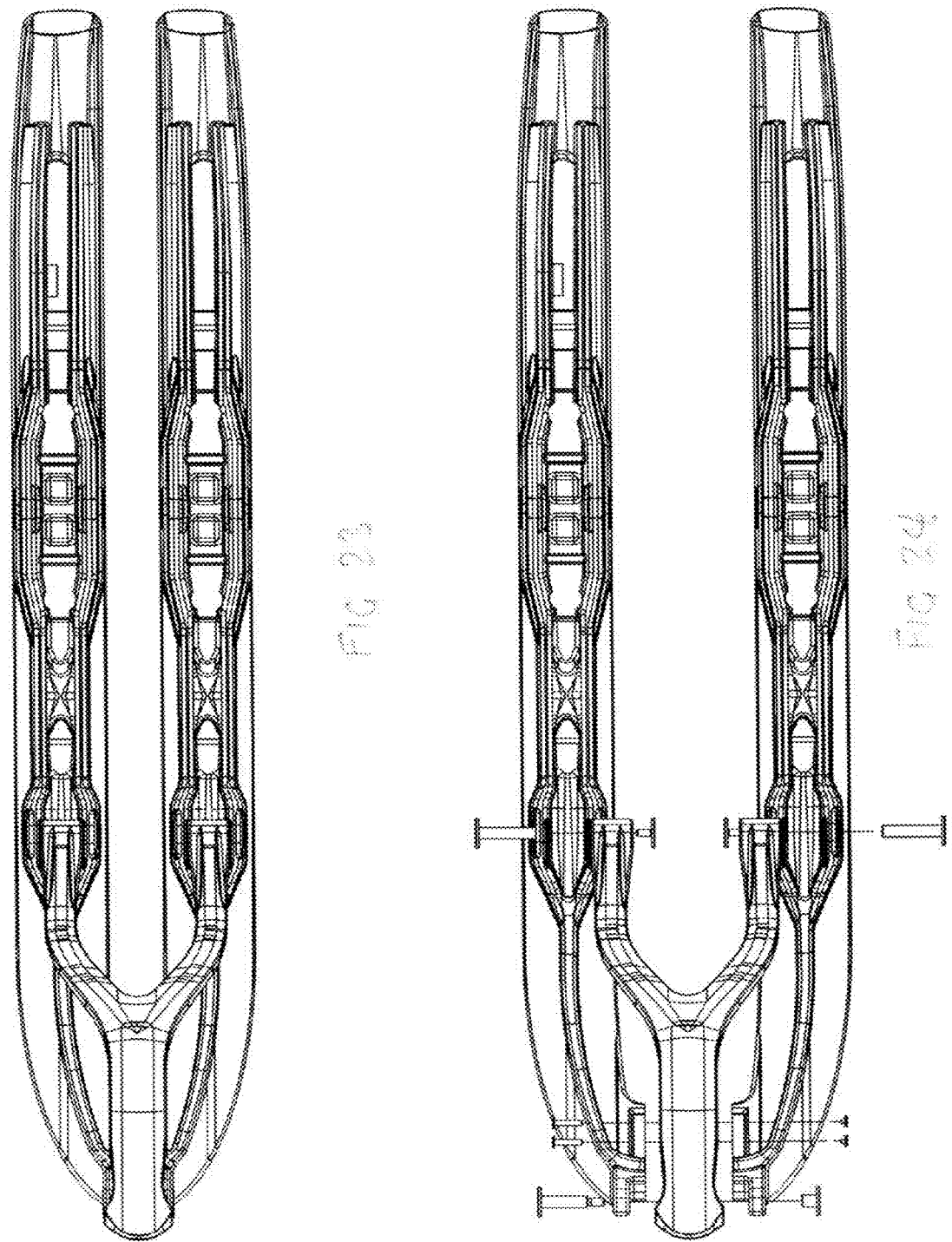

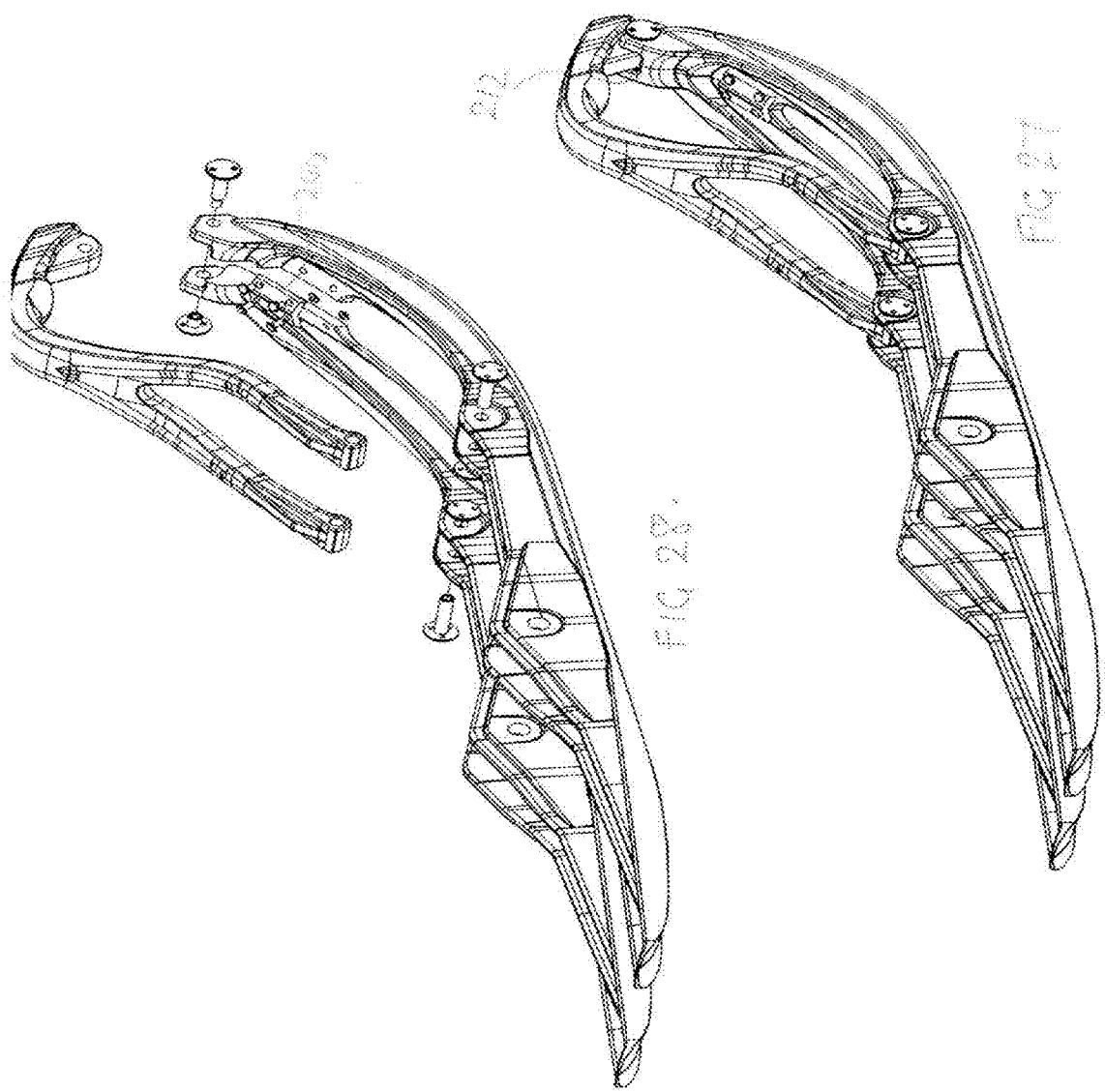

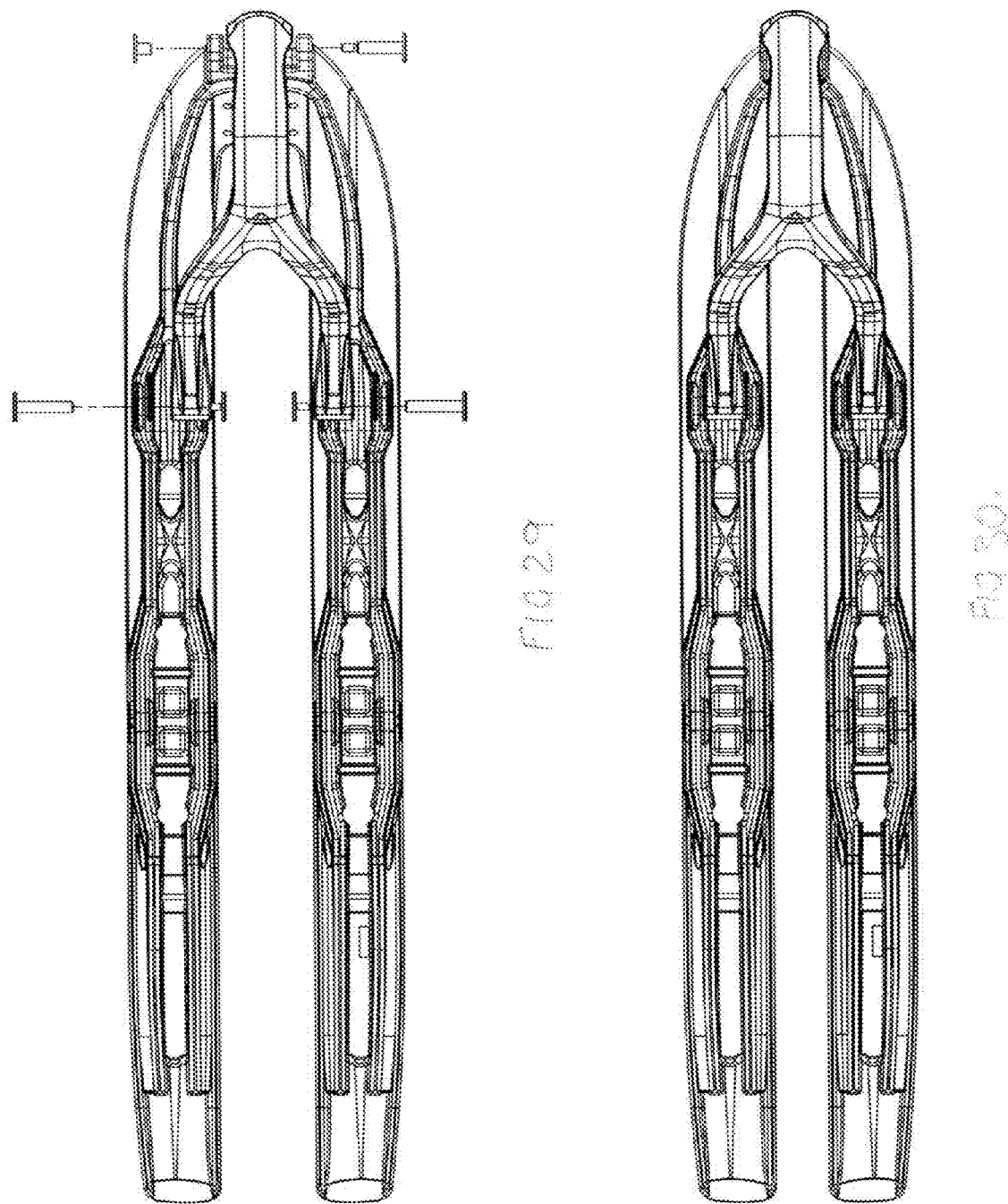

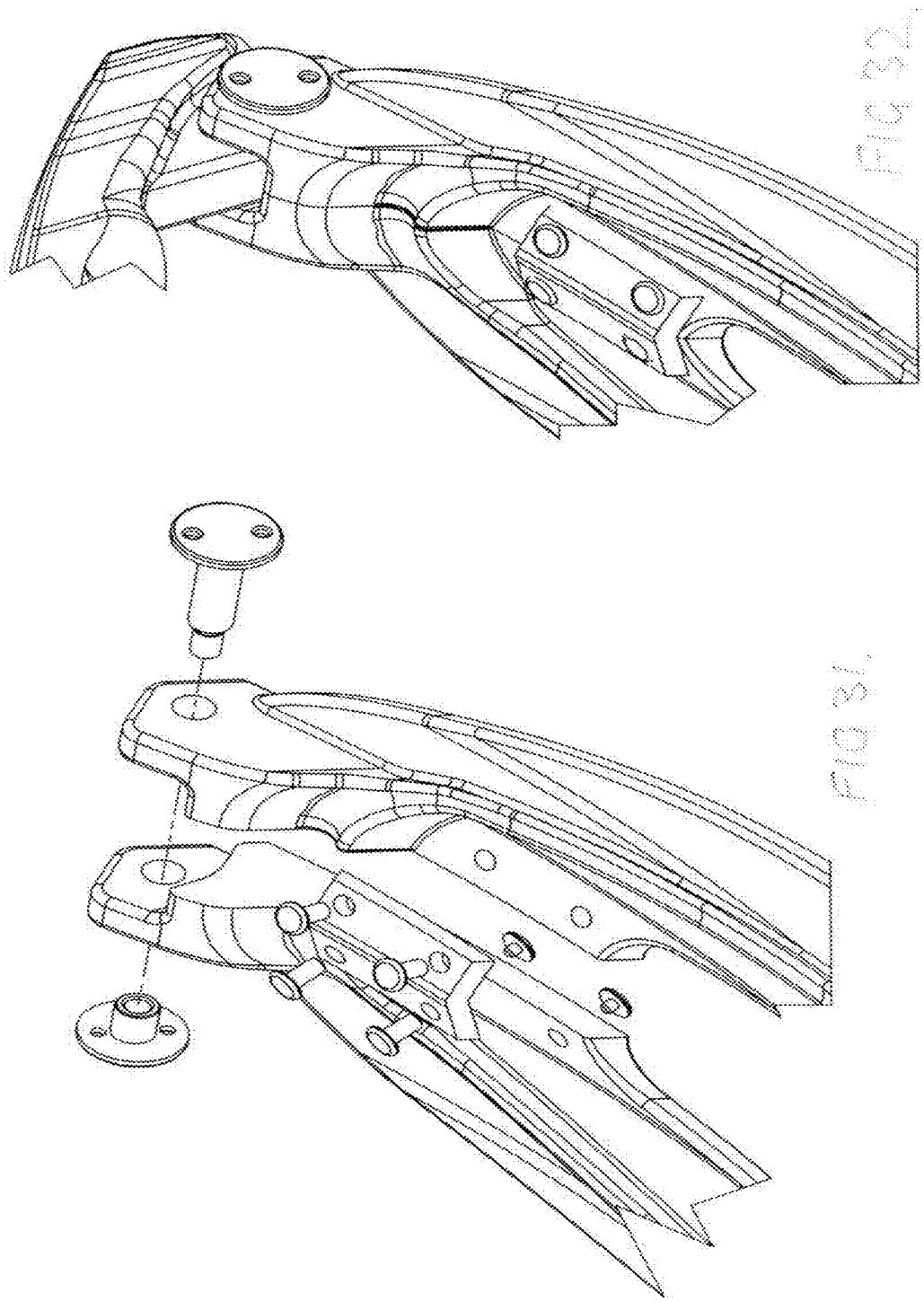

STRUT FOR SNOWMOBILE

CROSS REFERENCE TO RELATED APPLICATIONS

This application is a continuation-in-part of U.S. patent application Ser. No. 12/046,991 filed Mar. 12, 2008 which claims priority from U.S. Provisional Application No. 60/894,252 filed Mar. 12, 2007 and Canadian Patent Application No. 2,604,041 filed Oct. 22, 2007 and is a continuation-in-part of U.S. patent application Ser. No. 12/906,776 filed Oct. 18, 2010 which claims priority from U.S. Provisional Application No. 61/252,411 filed Oct. 16, 2009; the contents of which are incorporated herein by reference.

FIELD OF THE INVENTION

The present invention relates to snowmobiles in particular to skis for such snowmobiles.

DESCRIPTION OF THE PRIOR ART

The snowmobile is a well known class of machine and is used for transportation over snow. The snowmobiles typically have a belt to provide traction over the snow at the rear of the machine and a pair of ski's at the front of the machine. The ski's are steerable so that the operator can steer the snowmobile around the desired course.

Snowmobiles are used in a variety of conditions from ice to fresh snow. As the design of snowmobile has evolved, the skis have themselves become more sophisticated to match the higher performance expectations of the snowmobile. Initially, a single runner was utilized on the underside of the ski to improve lateral traction. However, it was found that a single runner tended to follow the track left by other machines, causing the snowmobile to "dart." A further development used a pair of parallel runners on the underside of the ski. Whilst this mitigates the darting, in certain conditions notably in powder snow, the skis are prone to floating which results in a loss of lateral traction and a resultant loss of steering. This is in part due to the tunnel structure used on the underside of the ski's with the parallel runners. In soft snow, the body of the ski may inhibit the runners from contacting the more solid snow and thereby limit the lateral resistance to that offered by the soft snow.

It is therefore an object of the present invention to provide a ski for a snowmobile in which the above disadvantages are obviated or mitigated.

SUMMARY OF THE INVENTION

In general terms, the present invention provides a snowmobile ski having a bifurcated body. The body is formed from a pair of laterally spaced rails which are interconnected at the tip into a unitary construction. Each of the rails has a runner on the underside. In use, the lateral spacing between the rails permits the snow to pass between the rails and thereby inhibit excessive floating in soft or powder snow conditions.

Preferably, the ski is supported upon on a spindle whose lower portion is bifurcated to provide a pair of legs passage of the snow between the legs of the spindle.

As a further preference, the ski includes a stabilizer bar extending from the tip to a portion of each of the ski's forward of the spindle. The distal end of the stabilizer bar is bifurcated to provide a pair of laterally spaced arms to facilitate the passage of snow between the arms of the stabilizer bar.

BRIEF DESCRIPTION OF THE DRAWINGS

An embodiment of the invention will now be described by way of example only with reference to the accompanying drawings in which:

FIG. 3 is a view from the underside of the ski assembly shown in FIG. 2;
FIG. 4 is a view on the line IV-IV of FIG. 3;
FIG. 5 is a view on the line V-V of FIG. 3;
FIG. 6 is a section of a portion of a spindle shown in FIG. 2;
FIG. 7 is a perspective view of a wheel assembly used with the ski assembly of FIG. 2;
FIG. 8 is a front perspective view of a ski shown in FIG. 2;
FIG. 9 is a rear perspective view of the ski of FIG. 8;
FIG. 10 is a front view of an alternative embodiment of spindle;
FIG. 11 is a side view of the spindle shown in FIG. 10;
FIG. 12 is a rear view of the spindle shown in FIG. 10;
FIG. 22 is a view similar to FIG. 21 with the components exploded;
FIG. 23 is a plan view of the ski of FIG. 21;
FIG. 24 is a plan view of the ski of FIG. 2 in exploded form;
FIG. 27 is a perspective view of a yet further embodiment of ski;
FIG. 28 is a perspective view showing the components of the ski of FIG. 27;
FIG. 29 is a plan view of the ski of FIG. 27 with the components exploded;
FIG. 30 is a plan view of the ski of FIG. 27 assembled;
FIG. 31 is a detailed perspective view of a forward portion of ski of FIG. 27 showing the components;
and
FIG. 32 is a view similar to FIG. 31 showing the components assembled.

DETAILED DESCRIPTION OF THE INVENTION

Figure 1:
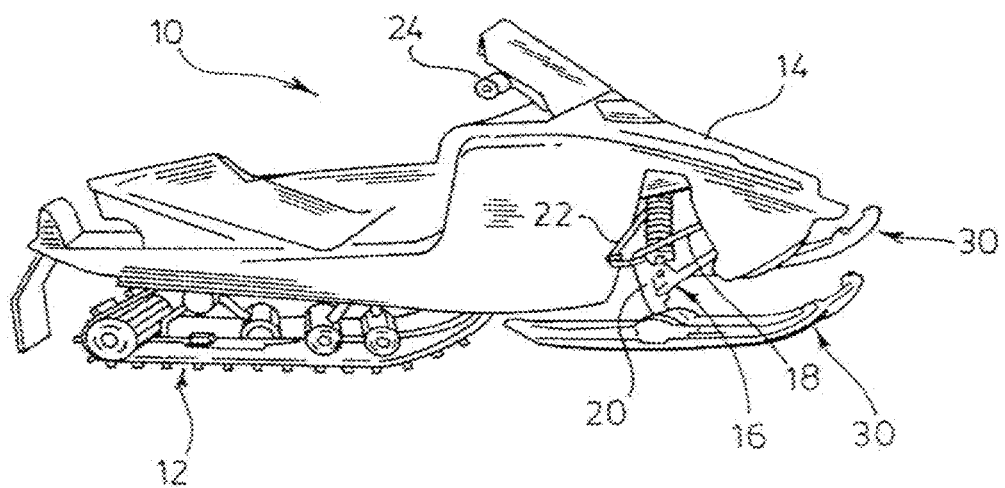
FIG. 1 is a side view of a snowmobile.

Referring therefore to the drawings, a snowmobile generally indicated 10 includes a traction drive 12 supporting a superstructure 14. The forward portion of the superstructure 14 is supported on a suspension assembly 16 that includes suspension arm 18 connected to a spindle 20. The spindle 20 is rotatable about a vertical axis relative to the suspension arm 18 and is connected through a steering link 22 to an operator control 24. The lower end of the spindle 20 is connected to a ski assembly 30 shown in greater detail in FIGS. 2 through 5 and 8 and 9.

It will be appreciated that the ski assembly 30 is similar on each side of the snowmobile except as to hand, and therefore only one such ski assembly will be described in detail. The overall dimensions of the skis will vary from machine to machine but will generally be similar to those found on conventional higher performance snowmobiles and constructed from similar materials.

Figure 2:
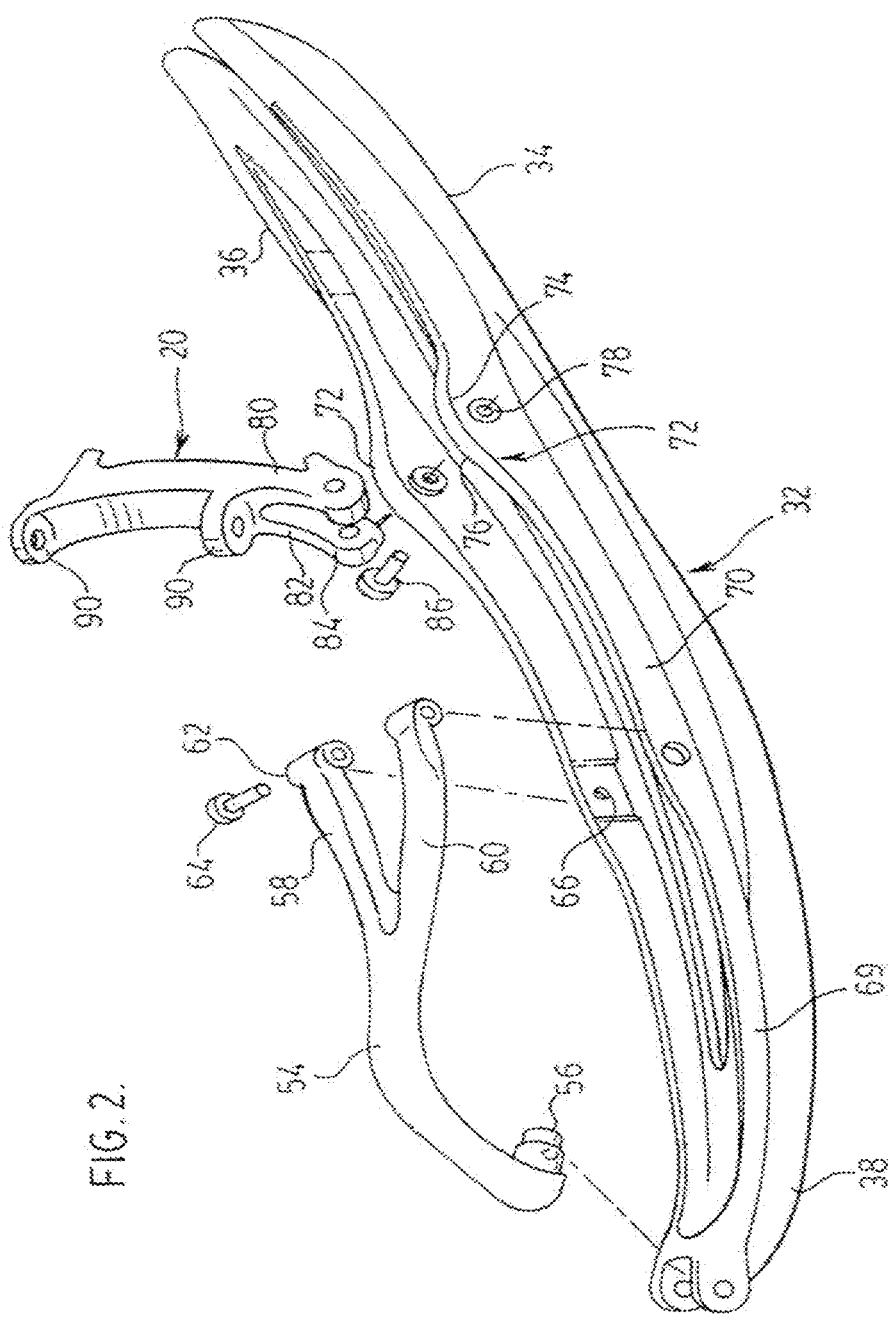
FIG. 2 is an exploded perspective view of a ski assembly.
Figure 13:
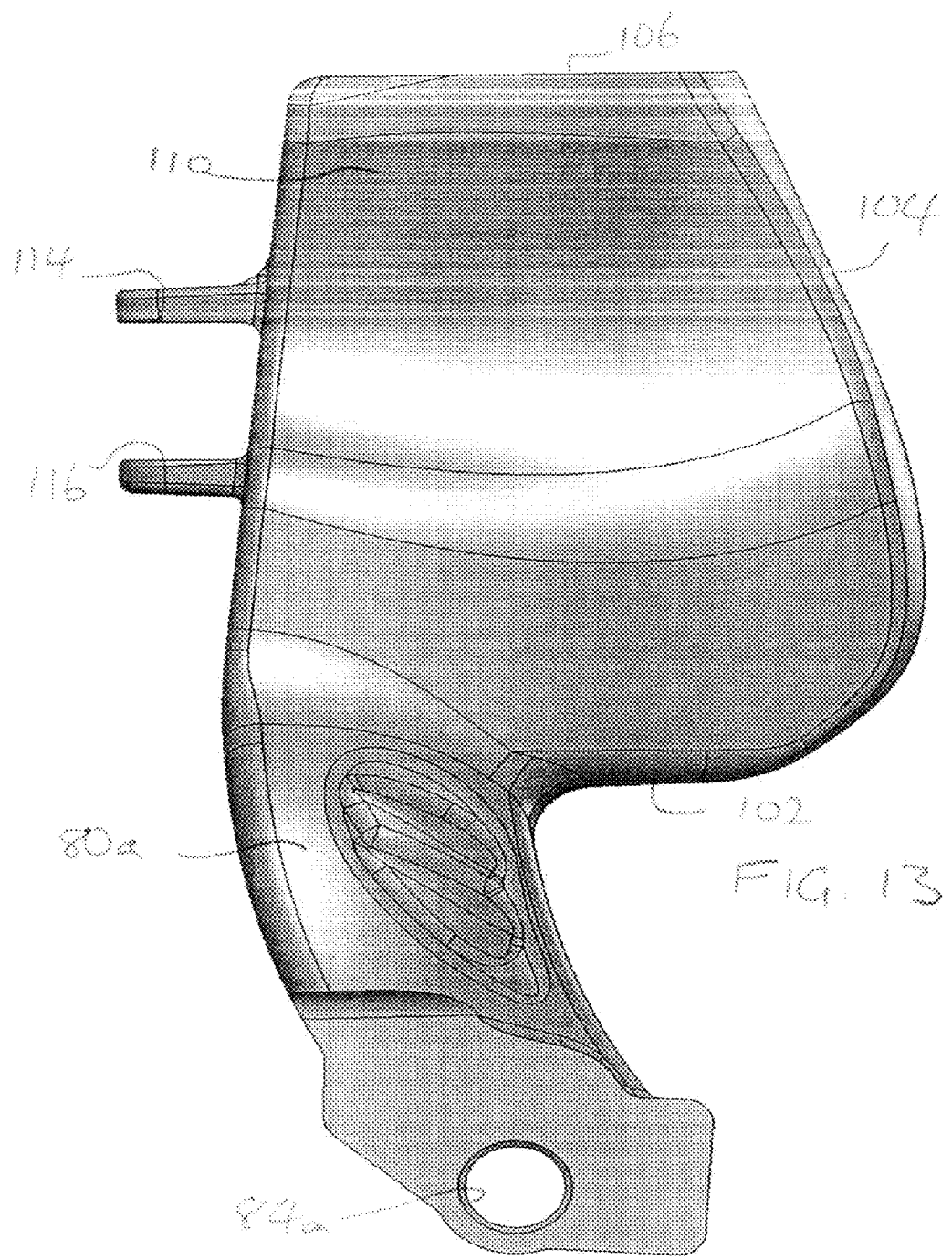
FIG. 13 is a side view from the opposite side to the view of FIG. 11.
Figure 14:
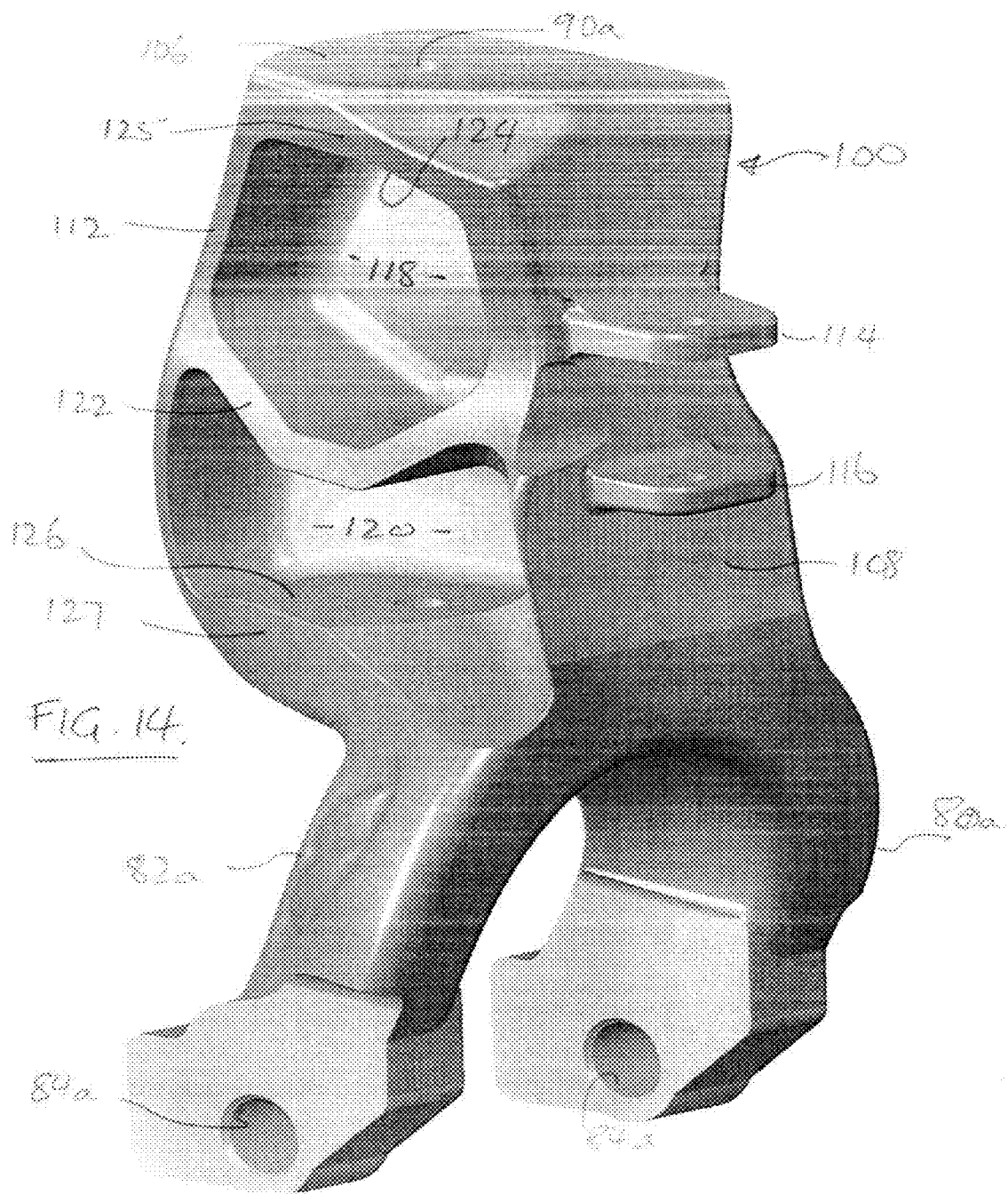
FIG. 14 is a rear perspective view of the spindle shown in FIG. 10.
Figure 15:
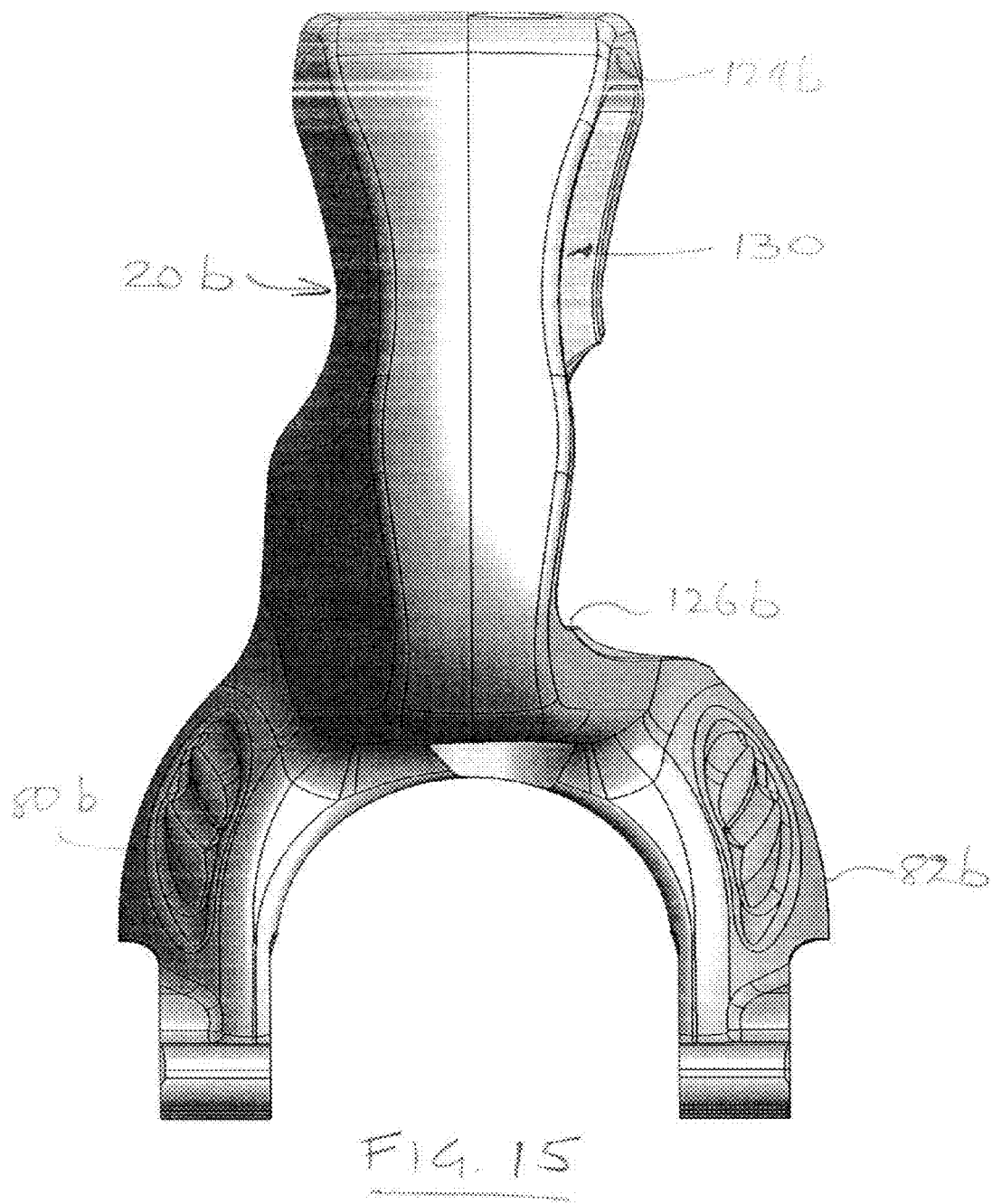
FIG. 15 is a front view similar to that of FIG. 10 of a further embodiment of spindle.
Figure 16:
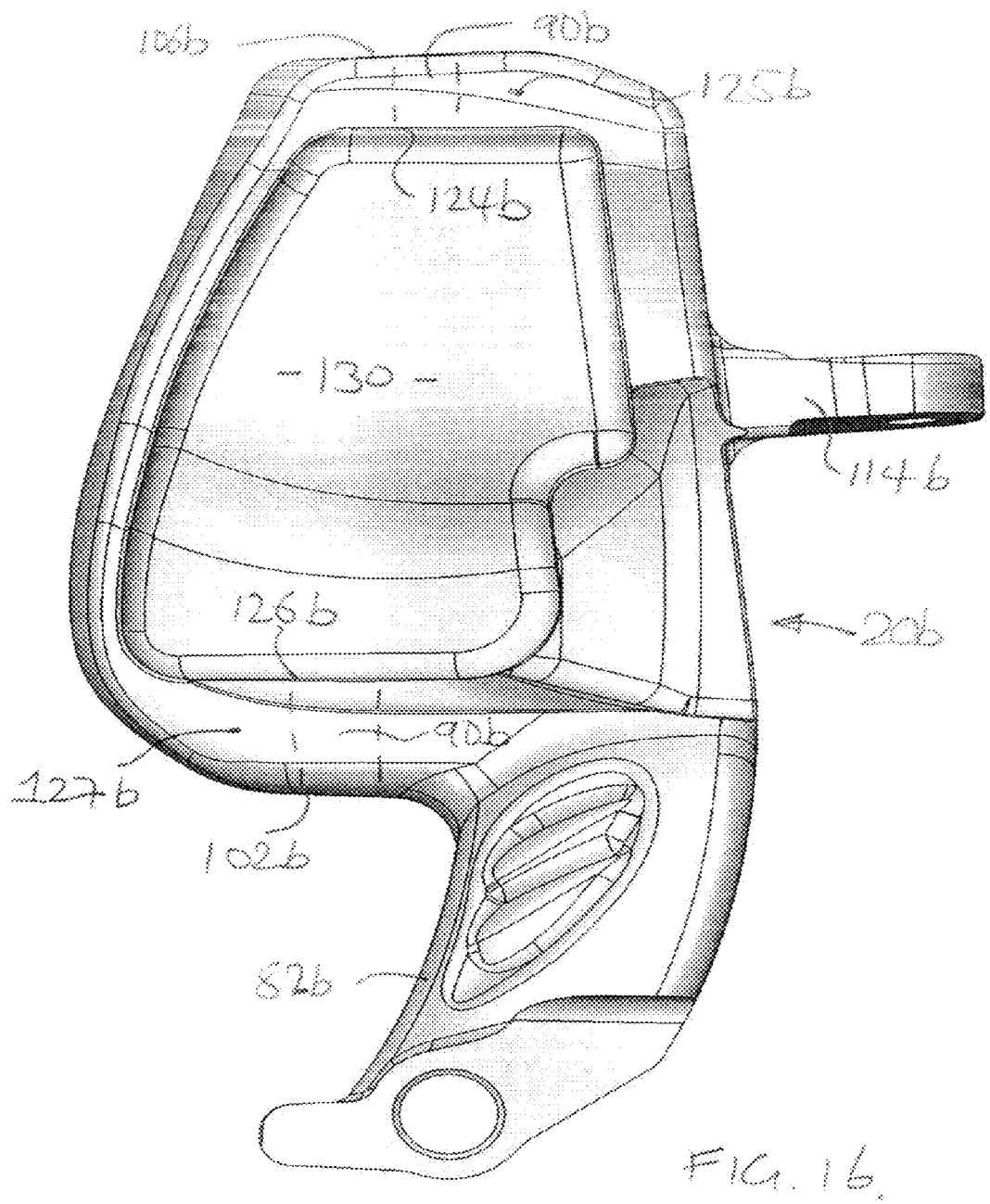
FIG. 16 is a side view of the spindle shown in FIG. 15.
Figure 17:
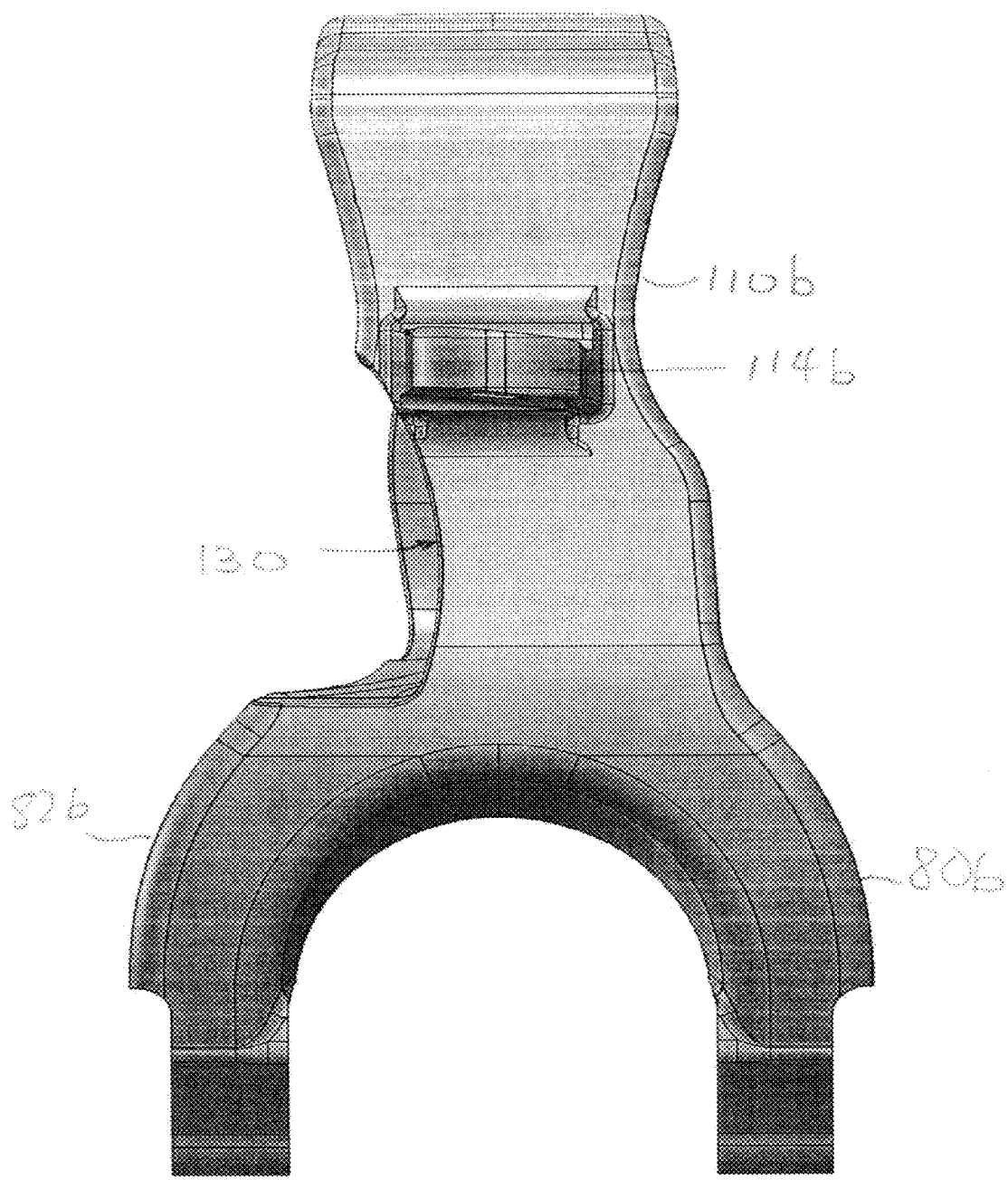
FIG. 17 is a rear view of the spindle shown in FIG. 15.
Figure 18:
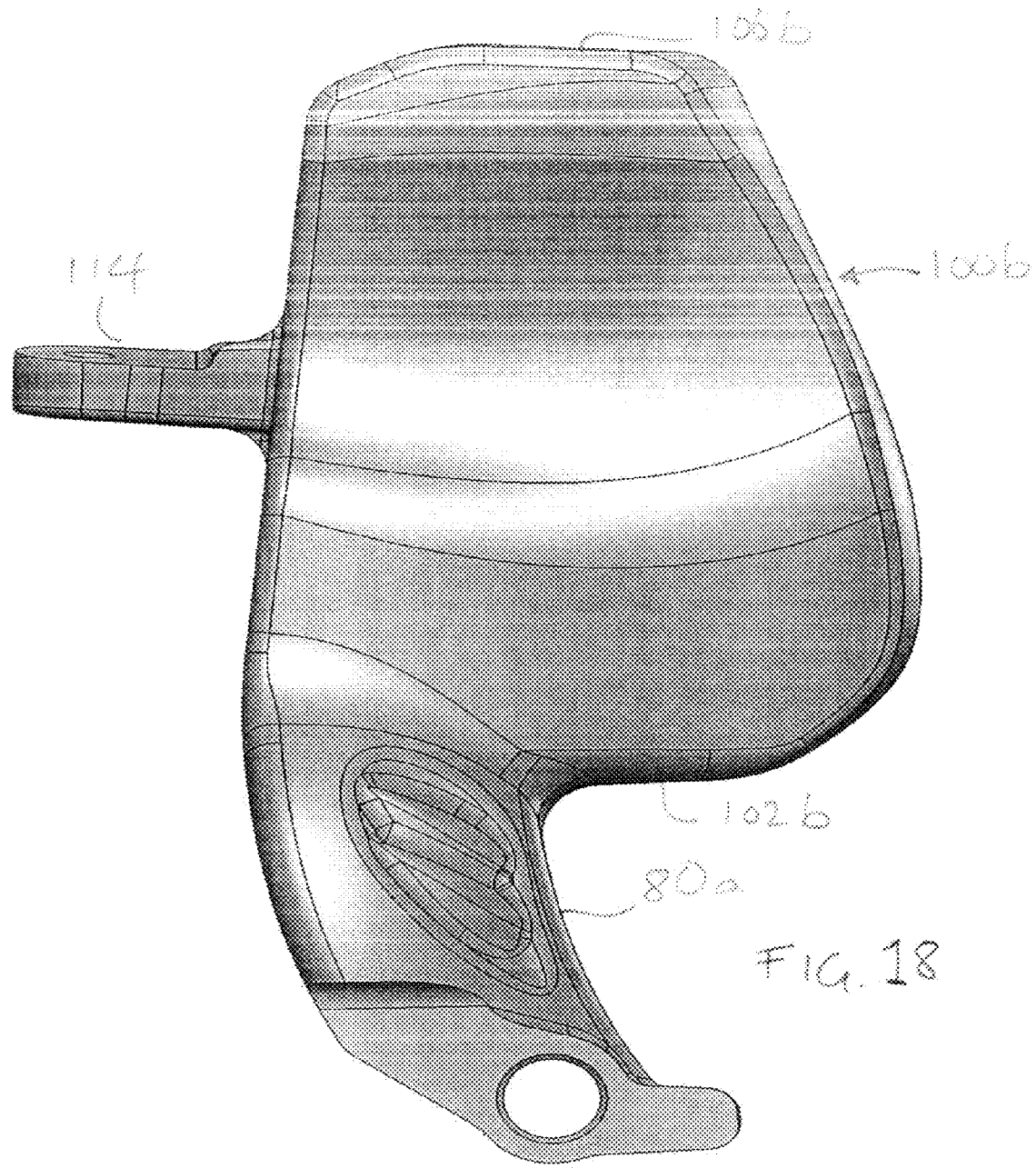
FIG. 18 is a view from the opposite side to that of FIG. 16.
Figure 19:
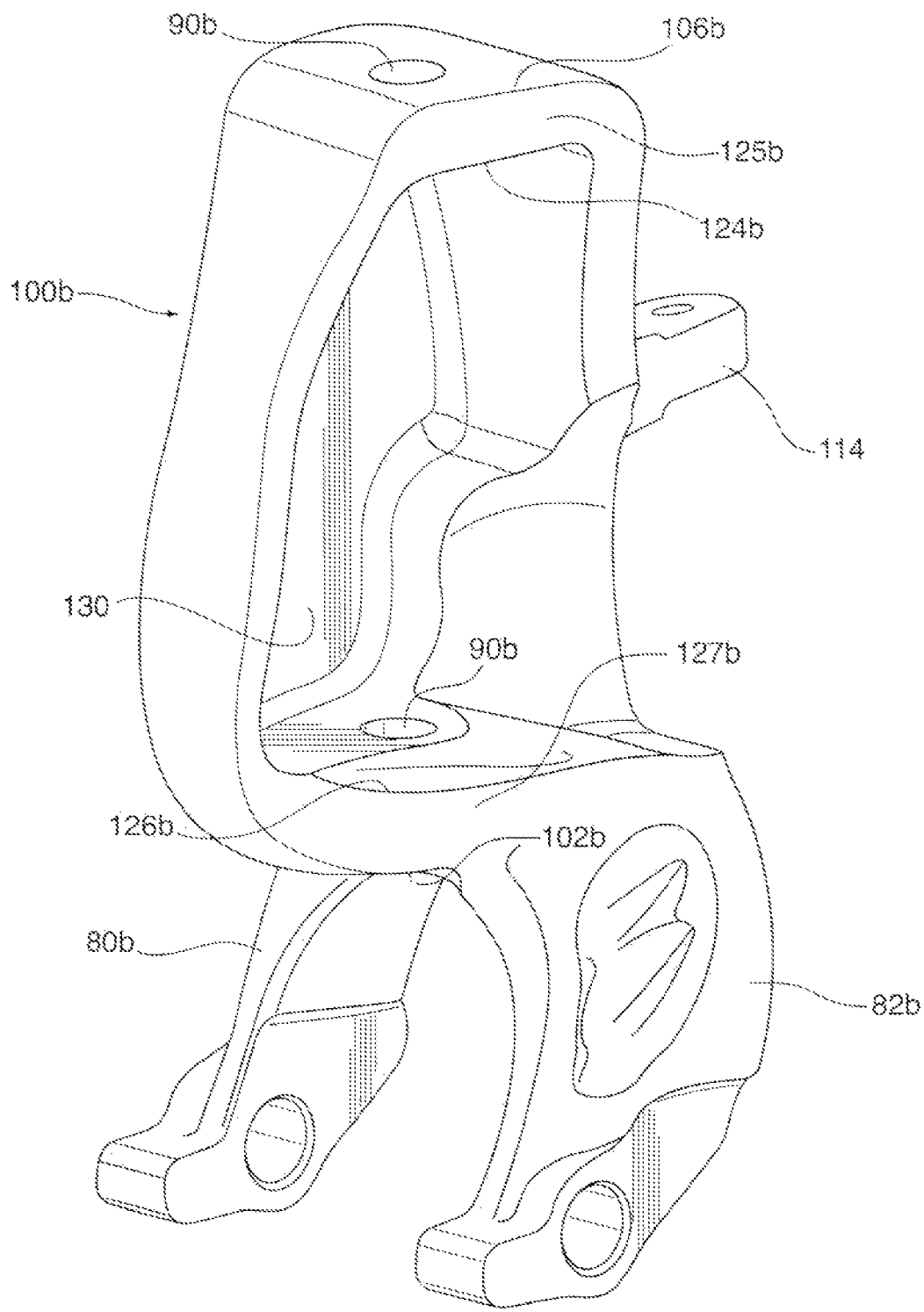
FIG. 19 is a front perspective view of the spindle shown in FIG. 15.
Figure 20:
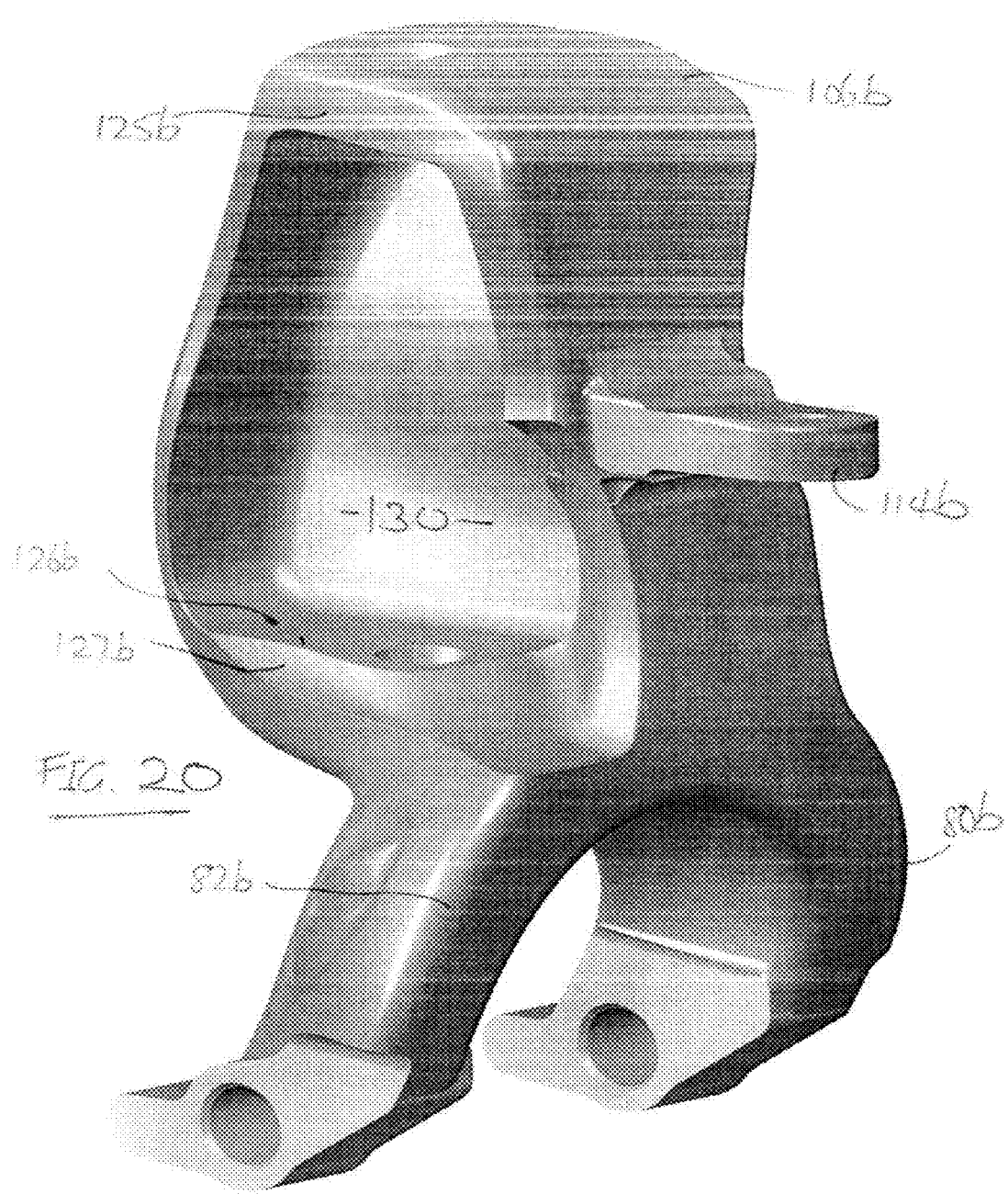
FIG. 20 is a rear perspective view of the spindle shown in FIG. 15.
Figure 21:
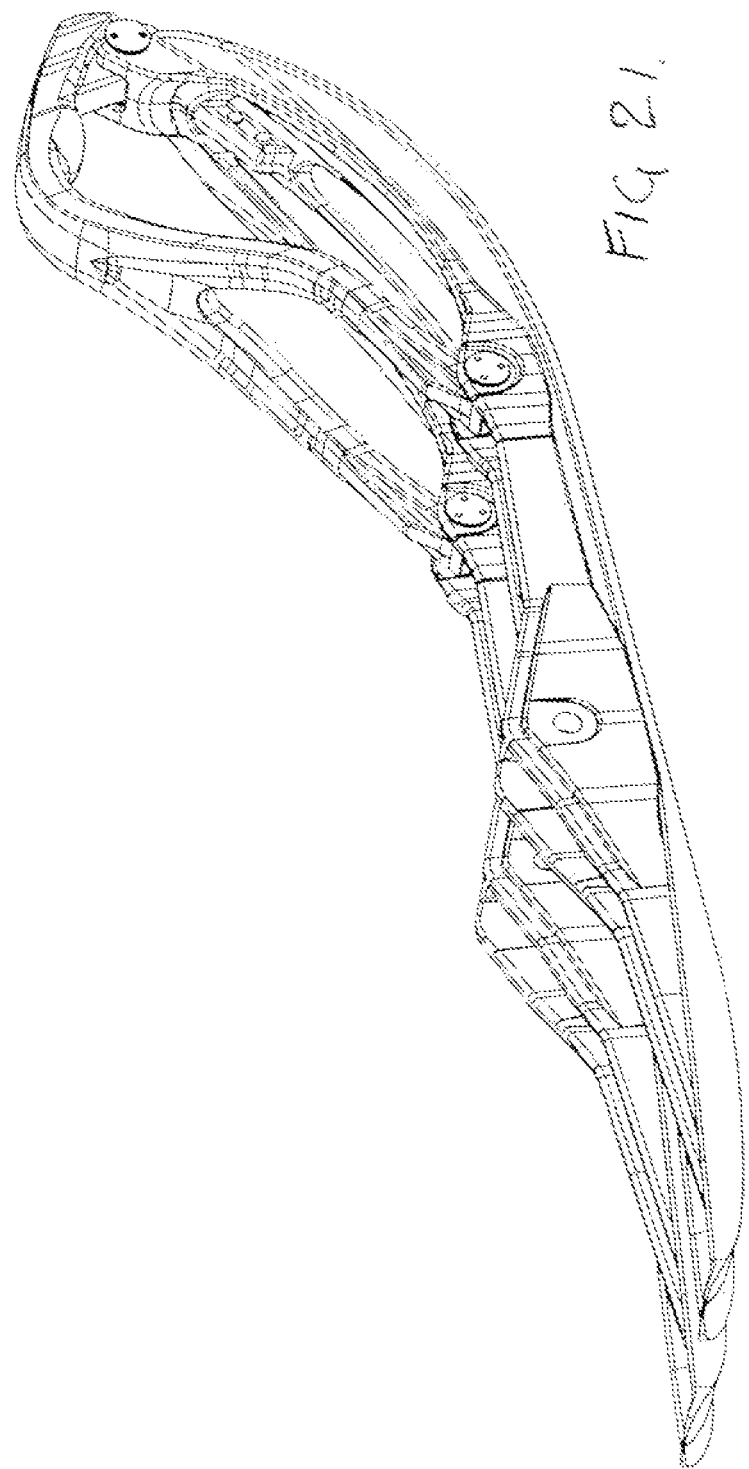
FIG. 21 is a perspective view of a further embodiment of ski.
Figure 26:
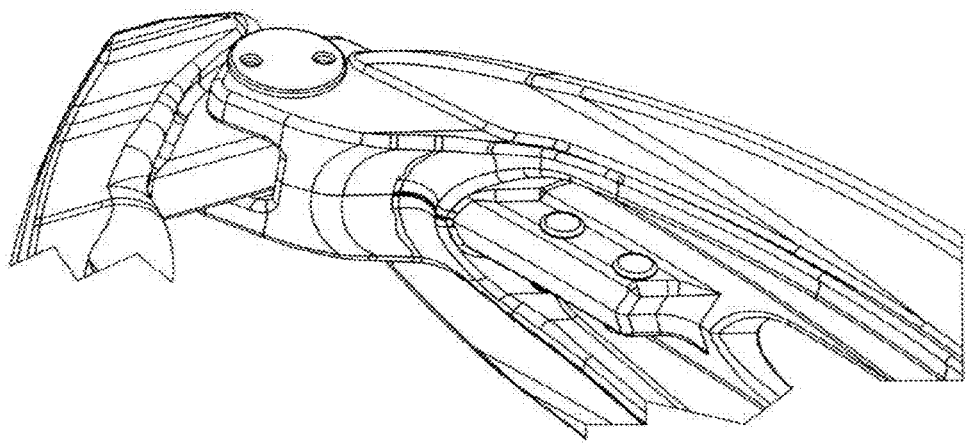
FIG. 26 is a view similar to FIG. 25 with the components assembled.
Figure 25:
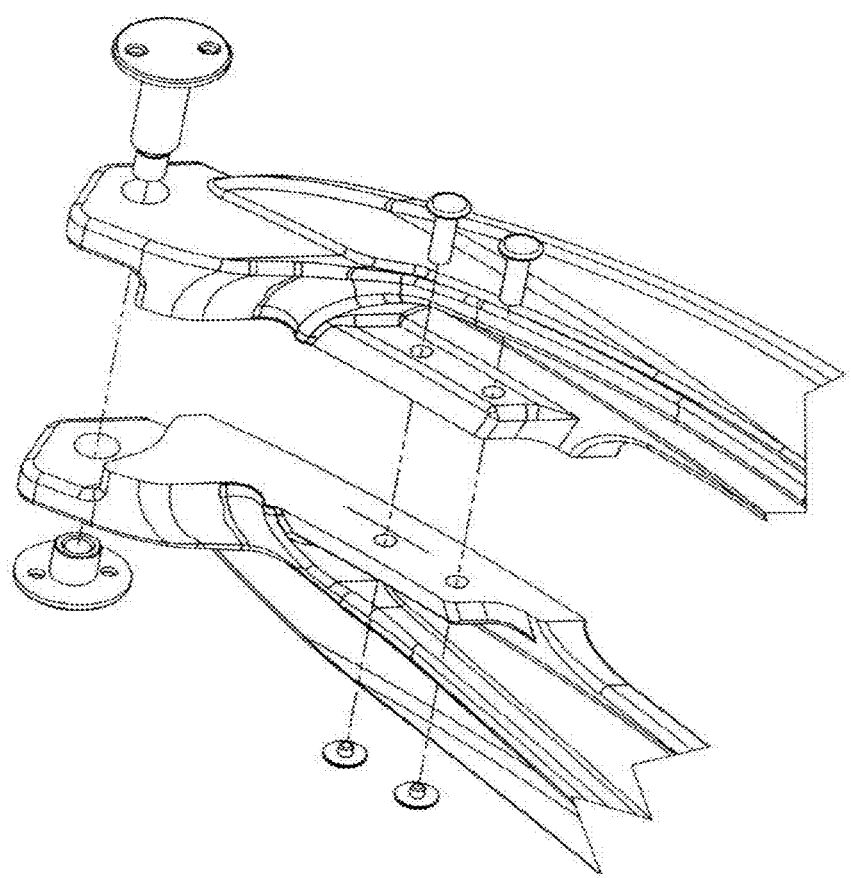
FIG. 25 is an enlarged perspective view of a portion of the ski of FIG. 21.

Referring therefore to FIGS. 2, 8 and 9 the ski assembly 30 includes a ski 32 typically moulded from a plastics material. The ski 32 has a body 33 formed with a pair of rails 34, 36 that are laterally spaced from one another over substantially the entire length of the ski body 33. The rails 34, 36 are connected at the tip 38 to provide a unitary construction.

As shown in FIGS. 3 and 4, each of the rails 34, 36 has a under surface 40, 42 respectively that is formed with a concave cylindrical recess 44. The recess 44 is dimensioned to receive a steel runner 46 that is secured in the recess 44 by a bolt (not shown) extending through the body of the rail. The runner 46 has longitudinal slots 48 formed in its lower surface to receive a carbide insert 50. The carbide insert 50 provides a wear resistant insert to the runner 46.

As can best be seen in FIG. 5, the runner 46 extends partially along the under surface 40, 42 of each of the rails 34, 36. The rails 34, 36 are formed with an aperture 52 which permits the runner 46 to pass through the rail from the lower surface 40, 42 to the opposite upper surface. The runner 46 extends toward and across the tip 38 of the ski 32, as shown in dotted lines in FIG. 3, so as to form a continuous runner along each of the rails 34, 36. The continuous runner enhances the strength for high performance.

As best seen in FIG. 2, a stabilizer bar 54 is secured to the tip 38 through a universal joint assembly 56 and extends rearwardly for attachment to the ski. The stabilizer bar 54 is bifurcated so as to provide a pair of arms 58, 60 that progressively diverge in a rearward direction. The distal end of each of the arms 58, 60 is formed with a bushing 62 that receives a connecting bolt 64. The bushing 62 may be elastomeric or steel bushings depending upon the application and the bolts 64 are received in holes 66 formed in spaced upstanding flanges 70 formed on the upper surface of each of the rails 34, 36. A rib 69 extends rearwardly from the tip 38 to the flanges 70. The flanges 70 extend along the rails 34, 36 to provide a socket 72 to receive the spindle 20 and provide a mounting point for the ski body 33. The socket 72 has a pair of laterally spaced walls 74, 76 with reinforced holes 78 integrally formed with the walls 74, 76.

The spindle 20 is bifurcated at its lower end to provide a pair of legs 80, 82 that are received in respective ones of the sockets 72 between the walls 74, 76. The legs 80, 82 have lateral bores 84 for alignment with the reinforced holes 78 to receive connecting bolts 86. The spindle 20 is connected to the suspension arms through mounting holes 90 in conventional manner.

As can best be seen in FIG. 6, legs 80, 82 on spindle 20 terminate in a bore 92 that is asymmetric in cross section. As shown, the bore 92 is part cylindrical with a flat on one side to provide a D shaped cross section. A hole 94 extends through the walls of the bore 92. A wheel assembly indicated 100 in FIG. 7 includes a wheel 102 supported on spindle 104 at the lower end of a vertical leg 106. The vertical leg 106 is dimensioned at its upper end to be received in the bore 92. A hole 110 extends through the leg 106 for alignment with the hole 94 in the legs 80, 82 so that a securing pin 112 may hold the wheel 100 in situ such that the axle is perpendicular to the length of the ski. Vertical leg 106 has shoulders (not shown) mating with the spindle to support the weight of the machine on the ground, thereby decreasing stress on securing pin 112.

In use on snow, the laterally spaced ski rails 34, 36 provides support for the runner 46. Flotation of the ski body 32 is inhibited by permitting the snow to pass between the ski rails 34, 36 and thereby allow the runner 46 to descend through soft snow to a firmer stratum of packed snow. The bifurcation of the stabilizer bar 56 and the spindle 20 provides a clear passage for the snow through the ski assembly 32 to minimize build up of snow and drag.

The spindle 20 secures the two ski rails 34, 36 to one another whilst permitting limited independent flexure as the ski assembly passes over the snow. The runner 46 contributes to the torsional resilience and bending strength of the ski whilst providing an enhanced contact with the firm or packed snow. A continuous runner is preferred for improved performance but it will be appreciated that a pair of runners may be used, one on each rail 34, 36, for less arduous conditions.

If it is necessary to transport the snowmobile over open ground, the wheel assembly 100 may be inserted between the rails 34, 36 and secured in the bore 92. The locking pin may then be inserted through the holes 94 and 110 to lock the wheels in position below the ski assembly. In this manner, the under side of the skis are elevated from the ground allowing the machine to be rolled along the ground without damage to the skis. The D shaped cross section inhibits rotation of the wheel about a vertical axis with the weight transferred along the spindle 20 so as not to load the locking pin 112.

A further embodiment of spindle is shown in FIGS. 10 through 15 in which like reference numerals to those of FIGS. 1 through 9 will denote like components with a suffix a added for clarity.

Referring therefore to FIGS. 10 through 15, a spindle 20a has a pair of legs 80a, 82a with transverse bores 84a at the lower end of the legs 80a, 82a. The legs 80a, 82a extend downwardly from a head 100. The head 100 has a lower face 102 extending forwardly from the legs 80a,82a. The lower face 102 merges smoothly with a convex front face 104 that curves rearwardly towards a flat top face 106. A generally linear rear face 108 extends from the top face 106 to the rear of the legs 80a,82a. A pair of side faces 110, 112 extend between the bottom and top faces 102,106 and the front and rear faces 104,108 and, as can be seen in FIGS. 10 through 14, the faces defining the head 100 are smoothly curved to avoid transitional edges.

A pair of tongues 114 extend from the rear face 108 and have holes 116 to permit connection to a steering link.

As best seen in FIG. 11, the inwardly directed side face 112 is contoured to provide a pair of cavities 118,120. In the embodiment shown in FIG. 11, a web 122 is located between cavity 118 and cavity 120 to extend between the front face 104 and the rear face 108. The upper portion of cavity 118 defines a roof 124 disposed generally parallel to the top surface 106. Similarly, the lower portion of cavity 120 defines a floor 126 disposed generally parallel to the under surface 102. The head 100 therefore has an upper web 125, defined between the roof 124 and top face 106, intermediate web 122 and a lower web 127, defined between the floor 126 and bottom face 106. It will be appreciated that the side surface 112 delimits the lateral extent of the roof 124, web 122 and floor 126 so that those features are contained within the envelope of the head 100.

Holes 90a are formed in the upper web 125, the intermediate web 122 and the lower web 127. The holes 90a provide mounting points for the suspension elements shown in ghosted outline on FIG. 11. Thus the upper suspension element U is secured above the upper web 125 and the lower suspension element L is secured between the intermediate web 122 and the lower web 126 within the cavity 120. The rear portion of the cavity 120 is contoured, as indicated at 130, to facilitate the required range of movement of the spindle on the suspension element.

It will be appreciated that the spindle 20a is handed so that a mirror image of the spindle shown in FIGS. 10 through 14 is provided for the opposite side of the snowmobile.

In operation, the legs 80a, 82a are connected to the mounting points on respective ones of the skis 32 and the suspension elements connected to the holes 90a. The legs 80a, 82a support the rails 34, 36 whilst allowing snow to pass through the spacing between the rails and through the bifurcated legs 80a, 82a of the spindle 20a. The smoothly contoured head 100 provides an aerodynamic structure to support the suspension elements and encompasses those elements within the cavities 118, 120.

A further embodiment is shown in FIG. 15 through 20 in which like components will be identified with like reference numerals with the suffix "b" added for clarity. In the embodiment of FIGS. 15 through 20, the spindle 20b is formed with a single cavity 130 so as to define a roof 124b and floor 126b. The roof 124b defines an upper web 125b between the top surface 106b and the roof 124b and, similarly, a lower web 127b is defined between the floor 126b and the under surface 102b.

The cavity 130 is sized to permit a suspension element shown in ghosted outline to be secured within the cavity 130 through attachment points 90b. The upper suspension element U. again shown in ghosted outline is secured to the web 125b.

A single flange 114b is provided for connection to the steering link so that, with the legs 80b, 82b connected to the skis 32 and to the suspension and steering elements, the spindle 20b is operable to support the ski in normal use and impart steering motions to them.

In both embodiments, the head 100 may be cast and/or forged and the configuration of the cavities 118, 120, 130 machined to suit the mounting points and suspension elements of existing vehicles. In this manner, the basic configuration of the spindle 20a may be used in a variety of applications. It will also be noted that the outer face 110 forms a continuous web forming the rear face of the cavities 118,120, 130 thereby adding to the rigidity of the head in use.

A further embodiment of ski is shown in FIGS. 21 through 26 in which like components will be identified with a like reference numeral with a suffix "c" added for clarity. The ski of the embodiment of the FIGS. 21 through 26 may be used with either of the spindles shown in FIGS. 10 through 20, or with the spindles shown in FIGS. 1 through 6.

The overall configuration of the ski assembly 30c is similar to that shown in FIGS. 8 and 9. However the body 33c is formed as separate rails 34c, 36c, that are mechanically connected to one another, rather than the integrally moulded body 33 of FIGS. 8 and 9. In the embodiment of FIGS. 21 through 26, each of the rails 34c, 36c is separately moulded and each has an upstanding flange 200 adjacent its tip 38c. The flange 200 presents a planar face 202 for an abutment with a similar face on the flange 200 of the adjacent rail. Holes 204 are formed in the web 200 to receive bolts 206. The bolts pass through the holes 204 in each of the webs 200 and are secured by nuts 208.

An arcuate rabbet 210 is formed at the tip of each of the rails 34c, 36c to define a groove 212 at the forward extremity of the body 33c. The groove 212 receives a tongue 214 of the stabilizer 54c which is secured to the body 33c by a bolt 216 passing through aligned holes 218. A nut 220 secures the bolt to the body 33c and secures the tongue 214 within the groove 212.

The stabilizer bar 54 has a pair of bifurcated arms 58c, 60c that extend rearwardly to be received between the flanges 70c. A bolt 64c secures the arms 54c, 58c to the flanges 70c.

Each of the bolts 64c is received in holes 66c to extend between the flanks 70c. The bolt 64c is formed with a disk shaped head 222 with circular holes 224 to receive pegs of a wrench. A complementary nut 226 secures the bolt 64c within the hole 66c and also has a disk shaped head 228.

The outwardly directed faces of the flanges 70c, are formed with a recesses 230 to accommodate the head 224 and the nut 226. The depth of the recess 230 corresponds to the thickness of the disk forming the head 224 or nut 226 so that a smooth exterior surface is provided to the flanges 70c when the bolts 64c are installed. Entrapment of snow as it passes between and around the skis is thus avoided.

Similarly, the laterally spaced walls 74c, 76c of the sockets 72c for attachment to the spindle are formed with recesses 232 to accommodate circular heads of the bolt securing the spindle to the ski. Again, therefore, a smooth exterior surface is provided to inhibit build-up of snow around the connection of the spindle to the ski.

The rails 34b, 36h are moulded from a suitable plastics materials, such as high molecular weight polypropylene, and are connected by bolts 206 at the tips to form a ski body 33c. The stabilizer bar 54c is then connected to the tip of the ski body 33c through the bolt 216 and the arms 58c, 54c connected through the bolts 64c to the flanges 70c. The body 33c may then be connected to the legs of a spindle through bolts passing through the holes 78c formed in the sockets 72c.

A further embodiment of ski body is shown in FIGS. 27 through 32 and like reference numbers will be used to identify like components with a suffix "d" added for clarity.

In the embodiment of FIG. 27, rails 34d, 36d are moulded as separate components. Webs 200d are formed adjacent the tip of the rails 34d, 36d and holes 204d provided to extend in a vertical direction. A connecting bracket 240 bridges the webs 200 with connecting bolts 206 to secure the bridging piece 240 to each of the rails 34d, 36d.

The stabilizer bar 54d is connected to the tip as described above with respect to FIG. 22 and received between the flanges 70d in a similar manner. Again therefore the rails 34d, 36d may be formed as separate components and subsequently secured to one another to provide the ski body 33d.

In each embodiment of ski body the lateral spacing of the rails 34, 36 and the bifurcated legs of the stabilizer arm and spindle facilitate the passage of snow along the ski. In the embodiments of FIGS. 22 through 32, the recesses formed in the flanges 70 allow the heads of the connecting bolts to be flush with the exterior surface of the ski rails and further inhibit the build-up of snow in operation.

The invention claimed is:

1. A spindle to connect a snowmobile ski to a snowmobile, said spindle having a body with a pair of laterally spaced legs extending from said body in spaced relationship for connection to said ski, distal ends of each leg having a connection for connecting said legs to a respective mounting point on a ski, said connections being spaced from one another and each of said connections having an inwardly directed surface, said surfaces being spaced from one another to provide an unencumbered gap between said connections, whereby, in use, snow may pass freely between said connections and between said legs.

2. A spindle according to claim 1 wherein each of said connections includes a bore to receive a pin for pivotally connecting said spindle to said ski.

3. A spindle according to claim 1 wherein said spindle includes a bore in said body between said legs.

4. A spindle according to claim 3 wherein said bore is asymmetric.

5. A spindle according to claim 1 wherein said body includes a head having a longitudinal axis and said legs project laterally from said head and along said longitudinal axis.

6. A spindle according to claim 5 wherein said head includes a pair of oppositely directed lateral faces and one of said lateral faces includes a mounting point for a suspension component of said snowmobile.

7. A spindle according to claim 6 wherein a cavity is formed in said lateral face to receive said suspension component.

8. A spindle according to claim 7 wherein said cavity defines a pair of webs spaced apart along said longitudinal axis, said webs providing mounting points for respective ones of said suspension components.

9. A spindle according to claim 8 wherein a further web intermediate said lateral webs is formed in said cavity to subdivide said cavity.

10. A spindle according to claim 8 wherein said mounting point is configured to locate a suspension element within said cavity.

11. A spindle according to claim 10 wherein a further web intermediate said lateral webs is formed in said cavity to subdivide said cavity and a mounting point is formed in said intermediate web to permit a suspension element to be located between one of said lateral webs and said intermediate web.

12. A spindle according to claim 10 wherein said legs are connected to said head by arched shoulders projecting laterally to opposite sides of said head.

13. A spindle according to claim 12 wherein a surface of said head projects from the connection of said shoulders to said head.

14. A spindle according to claim 5 wherein sad head and said legs are offset.

* * * * *